(12) United States Patent
Lee et al.

(10) Patent No.: US 8,511,054 B2
(45) Date of Patent: Aug. 20, 2013

(54) METHOD OF ASSEMBLING FILAMENTS AND BUNDLE OF FILAMENTS OBTAINED BY THE METHOD

(75) Inventors: Chang-Bae Lee, Daegu (KR); Tae-Hak Park, Chilgok-Gun (KR); Il Nam, Daejeon (KR)

(73) Assignee: Kolon Industries, Inc., Kwacheon-si (KR)

( * ) Notice: Subject to any disclaimer, the term of this patent is extended or adjusted under 35 U.S.C. 154(b) by 0 days.

(21) Appl. No.: 13/559,076

(22) Filed: Jul. 26, 2012

(65) Prior Publication Data

US 2012/0285135 A1 Nov. 15, 2012

Related U.S. Application Data

(63) Continuation of application No. 12/599,129, filed as application No. PCT/KR2008/002655 on May 13, 2008, now Pat. No. 8,302,373.

(30) Foreign Application Priority Data

| May 10, 2007 | (KR) | .................. | 10-2007-0045460 |
| May 10, 2007 | (KR) | .................. | 10-2007-0045465 |
| May 14, 2007 | (KR) | .................. | 10-2007-0046518 |
| May 15, 2007 | (KR) | .................. | 10-2007-0047053 |

(51) Int. Cl.
  *D02G 3/22* (2006.01)
(52) U.S. Cl.
  USPC ............................................. 57/243
(58) Field of Classification Search
  USPC ............ 57/200, 243, 248; 264/364, 401
  See application file for complete search history.

(56) References Cited

U.S. PATENT DOCUMENTS

| 3,026,064 | A | | 3/1962 | Richard |
| 3,648,948 | A | | 3/1972 | Level |
| 4,118,921 | A | * | 10/1978 | Adams et al. ................ 57/200 |
| 4,161,903 | A | | 7/1979 | Sokol |
| 5,952,067 | A | | 9/1999 | Head |
| 2002/0166917 | A1 | | 11/2002 | Eagelman et al. |
| 2003/0122024 | A1 | | 7/2003 | Slezak |
| 2003/0205402 | A1 | * | 11/2003 | Koyasu et al. ............ 174/113 C |
| 2003/0209626 | A1 | | 11/2003 | Haber |

FOREIGN PATENT DOCUMENTS

| EP | 0 133 198 A2 | 2/1985 |
| JP | 2005-048299 A | 2/2005 |
| KR | 10-1994-0014991 A | 7/1994 |
| KR | 10-2000-0016325 U | 8/2000 |

* cited by examiner

*Primary Examiner* — Shaun R Hurley
(74) *Attorney, Agent, or Firm* — Sughrue Mion, PLLC

(57) ABSTRACT

Disclosed are a method of folding multiple filaments and a bundle of filament produced by the same. More particularly, the method of folding multiple filaments includes release-winding the filaments under a uniform release-winding tension, folding the released filaments in non-twisted states and winding the folded filaments to produce a bundle of filament, so as to effectively prevent some of the filaments in the bundle of filament from hanging down or becoming loose due to different tensions when the bundle of filament is release-wound for post processing. The bundle of filaments includes a plurality of filaments combined together in a non-twisted manner and has highly uniform weight of the filaments per unit length of the bundle of filament, wherein the standard deviation of the weight of each filament ranges from 0.0001 to 0.01 from their average weight.

7 Claims, 2 Drawing Sheets

FIG. 1        Prior Art
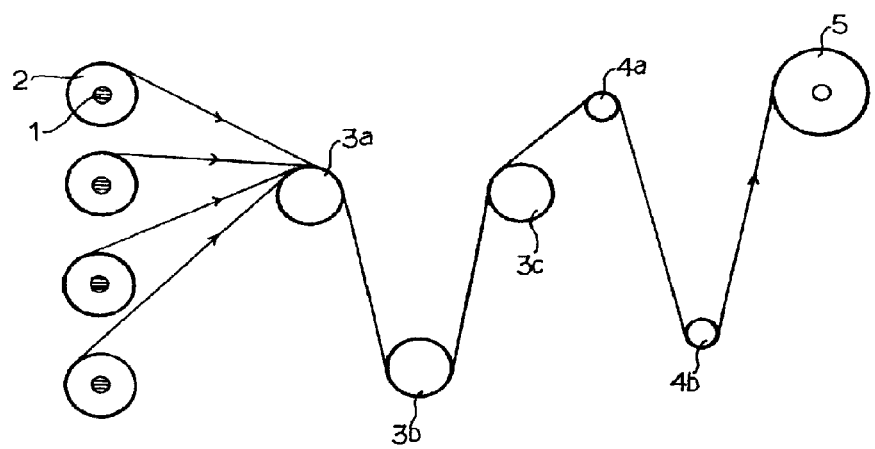
FIG. 2
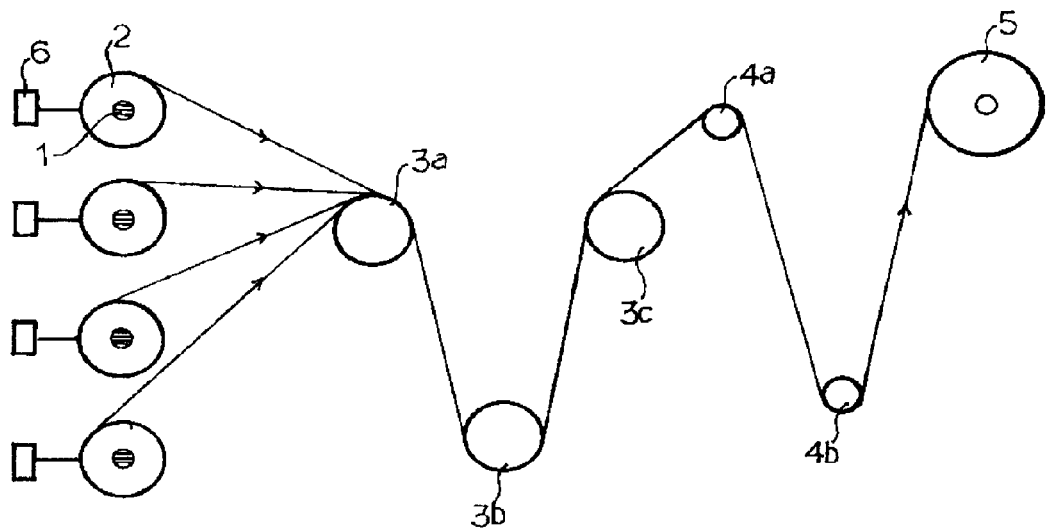

METHOD OF ASSEMBLING FILAMENTS AND BUNDLE OF FILAMENTS OBTAINED BY THE METHOD

CROSS REFERENCE TO RELATED APPLICATION

This application is continuation of U.S. patent application Ser. No. 12/599,129 (now U.S. Pat. No. 8,302,373) filed Nov. 23, 2009 which is a National Stage of International Application No. PCT/KR2008/002655 filed May 13, 2008, claiming priority based on Korean Patent Application Nos. KR10-2007-0045460 and KR10-2007-0045465, each filed May 10, 2007, KR10-2007-0046518 filed May 14, 2007, and KR10-2007-0047053 filed May 15, 2007, the contents of all of which are incorporated herein by reference in their entirety.

TECHNICAL FIELD

The present invention relates to a method of assembling filaments such as wholly aromatic polyamide filaments, and more particularly, to a method of assembles and winds the filaments in a non-twisted state after release-winding multiple filaments under a uniform release-winding tension (sometimes abbrev. to "tension"), and a bundle of filaments manufactured by the same.

Also, the present invention relates to a bundle of filaments such as wholly aromatic polyamide filaments, and more particularly, to a bundle of filaments that comprises multiple filaments (often abbrev. to "filaments") assembled together in a non-twisted state and has uniform or consistent weights of the filaments per unit length of the bundle of filaments and a reduced range of difference in length of the filaments so as to effectively prevent some of the filaments from hanging down (or coming lose) due to different tensions during a process of, for example, covering optic fibers with the bundle of filaments.

BACKGROUND ART

In a process of manufacturing optic cables, a bundle of wholly aromatic polyamide filaments, which is formed by assembling multiple wholly aromatic polyamide filaments together, is generally used as a reinforcement material to cover optic fibers.

In order to increase surface area of an optic fiber and improve modulus thereof, a bundle of filaments, which is used to cover the optic fiber, is preferably maintained in a non-twisted state.

If the bundle of filaments is twisted, there are generally problems in that the modulus is lowered and a surface area of the bundle of filaments is decreased during the covering process of an optic fiber.

On the other hand, if the bundle of filaments has no twist, there is a problem occurring frequently in that some of the filaments in the bundle of filaments are partially loosened due to a deviation in tensions when a bundle of bundle of filaments is release-wound for post-processing such as the optic fiber covering process.

Consequently, for a process for manufacturing a bundle of filaments by assembling together multiple filaments, it is very important to endow a uniform tension to each of the filaments.

Among conventionally known processes for manufacturing a bundle of filaments, one is shown in FIG. 1. As shown in FIG. 1, a plurality of filaments are assembled together after being released from a creel part comprising separate creels which have bobbins 2 wound with the filaments, by using several driver rollers 3a, 3b and 3c and guide rollers 4a and 4b. Creels 1 fixed on rotational axes rotating by the axes under the release-winding tension. After passing the driver rollers 3a, 3b, 3c and guide rollers 4a and 4b, the bundle of filaments is wound around a winder 5 to produce a bundle of filaments. However, such process uses no device for regulating the release-winding tension of each of the filaments released from the bobbins, and therefore, has difficulty in controlling the release-winding tension of the filaments released from the creels to be constant.

The above process also has other problems that it is difficult to control the release-winding tension for each of the filaments released from the creels to be constant since the filaments released from the creels have different paths to a point for folding them and, especially, it is more difficult to control the tension to be constant in the cases when the filaments have higher deniers and when each of the filaments is irregularly wound around the creels.

FIG. 1 is a schematic view illustrating a conventional process for assembling multiple filaments into a bundle of the filaments.

The resulting bundle of filaments have an irregular or inhomogeneous distribution of weights of the filaments per unit length along the bundle of filaments and may be composed of filaments of different lengths, so that the filaments were partially hanging down due to lack of uniform tension when the bundle of filaments is released and wound during post-processing.

Furthermore, the bundle of filaments produced by a known process often suffers from a thread cutting when an optic fiber is covered by the bundle of filaments in manufacturing an optic cable thereby causing poor workability or an increase in production costs. More particularly, even when the bundle of filaments does not undergo thread cuttings, it is difficult to smoothly cover the optic fiber so that the optic cable manufactured using the bundle of filaments has disadvantages such as an uneven surface and reduced quality.

Meanwhile, in order to regulate the winding tension of a winder known in the related art, there was proposed a process for preventing a thread cutting by using a yarn feed roller that has a separate motor to control a rotational speed of the feed roller so as to maintain the winding tension of the winder constant. However, this process was only used for winding a single filaments under a constant winding tension, and thus, failed to manufacture a bundle of filaments without twisting by keeping a desired tension constantly applied to each of multiple filaments while assembling the filaments together.

Another known process for controlling a winding tension of a winder is to regulate the winding tension by mounting a magnetic brake on each of driving rollers so as to ease a difficulty in manufacturing a winding drum with a large dimension due to increased linear winding velocity depending on increased diameter of the winding drum. However, this process also has the same problem as the process for preventing a thread cutting with use of a yarn feed roller since a single filament only is wound under a uniform winding tension by the large winding drum. Therefore, it cannot keep a desired tension constantly applied to each of multiple filaments while folding together the filaments thereby being not able to manufacture a bundle of filaments in a non-twisted state.

If the filaments are release-wound or wound under non-uniform tension conditions, a variation in the filaments lengths occurs between individual filaments to be assembled. In cabling work of an optic cable by using such a bundle of filament, the bundle of filaments may be cut while passing through different guides and/or interfere with adjacent filaments which are release-wound when the bundle of filaments is release-wound while rotating in a cross winder, thereby possibly applying a heavy load to a machine used. Even without thread cuttings, the bundle of filaments has rough or uneven surface and a few strands in the form of loops pulled out of a surface of the filaments before coating the cable, thus, resulting in potentially significant irregular appearance during a coating process.

Furthermore, if there are thread cuttings, the bundle of filaments may be subjected to the cabling work with loss of at least one or more strands and/or may involve other problems such as reduced supporting force such as elasticity of an optic cable as a final product.

DISCLOSURE OF THE INVENTION

Technical Problem

Accordingly, the present invention is directed to solve the problems described above in regard to conventional methods and an object of the present invention is to provide a method of assembling filaments that includes: release-winding a plurality of filaments under a given uniform release-winding tension; assembling the strands in non-twisted states into a bundle of filament; and winding the bundle of filaments over a winding machine.

Another object of the present invention is to provide a bundle of filaments that has a small standard deviation in weight of filaments for the bundle of filaments per unit length of the bundle of filaments and a narrow range of difference in length of the filaments, and effectively prevents some of the filaments from hanging down (or becoming loose) due to different tensions during a process of covering optic fibers with the bundle of filament.

Technical Means to Solve the Problem

In order to accomplish the above objects, the present invention provides a method for producing a bundle of filaments from multiple filaments, by mounting a controller for regulating a release-winding tension on each of creels 1 which have bobbins wound with the filaments, respectively, so as to control the release-winding tension to be constant.

The present invention also provides a method for producing a bundle of filaments from multiple filaments, by mounting a controller 7 that regulates self-driving and a rotational speed of each of creels 1 which have bobbins wound with the filaments, respectively, so that the creel 1 can regulate the rotational speed while rotating by a rotational axis by a self-driving power thereof, thus, control a release-winding tension of the filaments.

Hereinafter, the present invention will be described in more detail.

As shown in FIGS. 2 to 4, the method of assembling filaments according to the present invention comprises: release-winding filaments from a creel part consisting of a plurality of creels 1, each of which has a bobbin 2 wound with the filaments and rotates by a rotational axis under a release-winding tension, then, assembling the released filaments together by using a number of driver rollers 3a, 3b and 3c; and winding the assembled filaments over a winder 5 to produce a bundle of filament, wherein each of the creels 1 is equipped with a tension controller 6 for regulating a rotational speed of the creel to control the release-winding tension of the filaments to be constant.

The release-winding tension controller preferably includes a mechanical and/or an electrical tension controller to regulate a release-winding tension and the electrical tension controller is, for example, a powder brake.

According to the present invention, the mechanical tension controller means a controller that has a device for measuring a release-winding tension of a filaments and a brake for regulating a rotational speed of a creel driven under the release-winding tension, both of which are driven by a mechanical mechanism rather than electric power.

FIG. 2 is a schematic view illustrating a method of assembling filaments by means of a release-winding tension controller according to the present invention. FIG. 3 is a schematic view illustrating a mechanical release-winding tension controller (often referred to as "mechanical tension controller") fixed to a creel shown in FIG. 2, while FIG. 4 is a schematic view illustrating an electrical release-winding tension controller (often referred to as "electrical tension controller") fixed to a creel shown in FIG. 2.

The present invention preferably uses guide rollers 4a and 4b, which are typically located between the driver rollers 3a, 3b, 3c and the winder, that is, a winding roller 5.

The mechanical tension controller 6 is operated by a process comprising, for example: sensing a release-winding tension of a filament by means of a lever type device 6a for sensing the release-winding tension (often referred to as "tension sensing device"); and transferring the detected tension through a tension transfer device 6b in a belt form to a brake 6c for regulating a rotational speed of a bobbin that is fixed in a creel and rotated under the release-winding tension, as shown in FIG. 3.

If the tension is too large, a rear end of the tension sensing device 6a goes downward and causes the tension transfer device 6b connected to the tension sensing device to become loose, thereby reducing a braking level of the brake 6c. Consequently, the bobbin 2 fixed to the creel 1 can freely rotate under the release-winding tension and the filaments wound over the bobbin 2 is more quickly release-wound, thus, resulting in a decrease of the release-winding tension.

Conversely, if the tension is too small, a rear end of the tension sensing device 6a goes upward and causes the tension transfer device 6b connected to the tension sensing device to become tight-stretched, thereby increasing a braking level of the brake 6c.

Therefore, the bobbin 2 fixed to the creel 1 is restricted in rotating and the filament wound over the bobbin 2 is slowly release-wound, thus, resulting in an increase of the release-winding tension.

According to the present invention, the electrical tension controller means a controller that has a device for measuring a release-winding tension of a filament and a brake for regulating a rotational speed of a creel driven under the release-winding tension, both of which are driven by electric power and in which the brake starts running when the tension is equal to or more than a constant level.

FIG. 4 illustrates an electrical tension controller for regulating a release-winding tension.

The electrical tension controller 6 shown in FIG. 4 is operated by a process comprising, for example: comparing a given release-winding tension with a pre-input one in a controller 6f and calculating a compensated value based on a result of the comparison; and controlling a rotational speed of a bobbin fixed in a creel under a release-winding tension based on the compensated value by a brake 6c, otherwise, another process comprising: adopting a sensor 6e to detect a release-winding tension of a filament; comparing the detected tension with a pre-input tension in a controller 6f and calculating a compensated value; and transferring the compensated value to a brake 6c.

If the tension detected by the sensor 6e is greater than the pre-input tension, a braking level of the brake 6c is so low by the controller that the bobbin 2 fixed to the creel 1 can freely rotate under the release-winding tension and the filament wound over the bobbin 2 is more quickly release-wound, thus, resulting in decrease of the release-winding tension.

Conversely, if the tension is smaller than the pre-input tension, a braking level of the brake 6c is so high by the controller that the bobbin 2 fixed to the creel 1 is restricted in rotating and the filament wound over the bobbin 2 is slowly release-wound, thus, resulting in an increase of the release-winding tension.

According to the present invention, a powder brake as one of electric brakes comprises a device for measuring a release-winding tension of a filament and a brake for regulating a rotational speed of a creel rotating under the release-winding tension, both of them being run by electric power. Such a powder brake is defined as a tension controller in a friction clutch mode using powder.

The powder brake is operated by a process comprising, for example: detecting a release-winding tension of a filament by a sensor 6e fixed to the powder brake 6c; and controlling a rotational speed of a bobbin fixed to a creel depending on the detected tension by the powder brake 6c, as shown in FIG. 4.

In case that the tension detected by the sensor 6e is too large, the powder brake 6c keeps not gripping the creel 1 so that the bobbin 2 fixed to the creel 1 can freely rotate under the release-winding tension and the filament wound over the bobbin 2 is more quickly release-wound, thus, resulting in decrease of the release-winding tension.

Conversely, if the tension detected by the sensor 6e is too small, the powder brake 6c instantly grips the creel 1 so that the bobbin 2 fixed to the creel 1 is restricted in rotating and the filament wound over the bobbin 2 is slowly release-wound, thus, resulting in an increase of the release-winding tension.

Each of the driver rollers 3a, 3b and 3c preferably has a device for measuring length of the filament and a system for gently starting and stopping the roller.

The filament includes, for example, a wholly aromatic polyamide filament.

A method of assembling multiple filaments according to the present invention uses a release-winding tension controller 6 mounted on each of creels, which uniformly controls the release-winding tension of each of the filaments for the bundle of filament, so that all of the filaments can be release-wound under a uniform release-winding tension, then, be assembled together and wound in non-twisted states over a winding machine as a bundle of filament.

When the resulting bundle of filaments is release-wound for a following process such as optic fiber covering, the filaments exhibits high modulus owing to the non-twisted state and a wider surface area in covering the optic fiber while having no partial loosing of the filaments caused by a difference in tensions.

Another method of assembling multiple filaments according to the present invention comprises: release-winding the filaments from a creel part comprising separate creels, which have bobbins 2 wound with filaments, respectively; and assembling and winding the bundle of filaments in a non-twisted state as shown in FIG. 5. This method uses a controller 7 mounted on each of the creels 1, which regulates self-driving and a rotational speed of the creel 1, so that the creel 1 can regulate the rotational speed while rotating by a rotational axis by a self-driving power thereof, and thus, control a release-winding tension of the filaments to be constant.

Each of the creels 1 used in the above method actively rotates by the rotational axis by the self-driving power thereof rather than passive rotation under the release-winding tension. The rotational speed of the creel is controlled to be higher or lower by the controller when the tension is too great or too small, respectively.

FIG. 5 is a schematic view illustrating a method of assembling filaments by means of a controller 7 for regulating self-driving and a rotational speed of a creel, which is mounted on each of creels 1 according to the present invention.

Preferably, driver rollers 3a, 3b and 3c are located between the creels 1 and a winder 5 and guide rollers 4a and 4b are fixed between the driver rollers 3a, 3b and 3c and a winding roller, that is, the winder 5.

Each of the driver rollers 3a, 3b and 3c preferably has a device for measuring a length of the filaments and a system for gently starting and stopping the roller.

The creel 1 and the winder 5 are preferably equipped with tension control guides, respectively.

The filaments are preferably a wholly aromatic polyamide filament.

Since the method of assembling filaments shown in FIG. 5 adopts a driving pay-off mode release-winding process using self-driving of each of the creels 1 instead of the release-winding tension to release and wind the filaments, then, a plurality of filaments can be release-wound from the creels under a uniform release-winding tension then assembled together and wound in non-twisted states to produce a bundle of filament.

As a result, the produced bundle of filaments can exhibit high modulus owing to the non-twisted state and a wider surface area in covering optic fibers while preventing some of the filaments in the bundle of filaments from becoming loose due to a deviation in tensions when the bundle of filaments is release-wound for a following process such as optic fiber covering.

The bundle of filaments produced by any one of the above described methods according to the present invention is formed in the non-twisted state and characterized in that a standard deviation in weight of filaments per unit length of the bundle of filaments ranges from 0.0001 to 0.01.

Also, when cutting the bundle of filaments of the present invention to a length of 500 cm under a load of 0.05 g per denier, the filaments contained in the bundle of filaments have a range of difference in length of ±10 mm, and more preferably, ±2 mm.

In cases that the standard deviation in weight and the difference in length exceed the above defined ranges, respectively, it is liable to cause a partial loosing of the bundle of filaments when the bundle of filaments is release-wound for an optic fiber covering process.

When the filaments are release-wound or wound under a non-uniform tension, a difference in length occurs between the filaments. Also, if the resulting bundle of filaments is used in a cabling work of an optic cable, the filaments may be cut during passing through different guides and/or interfere with adjacent filaments which are release-wound when the bundle of filaments is release-wound while rotating in a cross winder, thereby possibly applying a heavy load to a machine used. Even without thread cuttings, the bundle of filaments has rough or uneven surface and a few strands in the form of loops pulled out of a surface of the filaments before coating, thus, resulting in potentially significant irregular appearance during coating.

Furthermore, if there are thread cuttings, the bundle of filaments may be subjected to the cabling work with loss of at least one or more strands and/or involve other problems such as reduced supporting force such as elasticity of an optic cable as a final product.

On the other hand, the bundle of filaments obtained by assembling and winding multiple filaments under a uniform tension can obtain excellent properties so as to satisfy requirements for cabling works such as workability, physical properties of an optic cable, uniformity in coating, etc.

The filament is preferably a wholly aromatic polyamide filament and comprises 500 to 1,500 strands of mono filaments with a mono fineness ranging from 1.0 to 2.5 denier.

A total fineness of the bundle of filaments ranges from 1,400 to 15,000 denier and the number of filaments contained in the bundle preferably ranges from 1,000 to 10,000.

A mono fineness of each of the filaments contained in the bundle preferably ranges from 1.0 to 2.5 denier.

According to the present invention, a standard deviation of the weights of filaments contained in a bundle per unit length of the bundle was determined as follows:

After hanging a weight with 0.05 g per denier of a sample (that is, the bundle of filaments) on the sample to be stretched straight, the sample was cut to a length of 90 cm.

Following this, the cut sample was split into separate filaments used for combining the sample. After weighing each of the filaments by means of an electronic scale, a standard deviation in weight of the filaments was determined by using the measured weights of the filaments.

The above procedure was repeated five (5) times and a mean standard deviation was calculated from the results, which was in turn, defined as a standard deviation in weight of filaments contained in a bundle of filaments per unit length of the bundle of filaments.

According to the present invention, a range of difference in length of filaments contained in a bundle of filaments was determined as follows:

After hanging a weight with 0.05 g per denier of a sample (that is, the bundle of filament) on the sample to be stretched straight, the sample was cut to a length of 500 cm.

Next, the cut sample was split into separate filaments that had been assembled to form the sample.

Following this, after hanging a 0.05 g weight per denier of the filaments on each of the separate filaments to be stretched straight, the length of the filament was measured.

The above procedure was repeated five (5) times and a mean value for the range of difference in length of the filaments was calculated from the results.

Advantageous Effects

A method of producing a bundle of filament from multiple filaments according to the present invention comprises release-winding the filaments with a uniform release-winding tension, assembling the released strands into a bundle of filament in a non-twisted state, and winding the bundle of filament over a winding machine. The resulting bundle of filaments can effectively prevent some of the filaments from becoming loose due to a deviation in tensions when the bundle of filament is released and wound for a post processing.

Accordingly, the present invention is useful for producing bundle of filaments from wholly aromatic polyamide filaments, which are typically used for covering optic fibers in manufacturing optic cables.

BRIEF DESCRIPTION OF THE DRAWINGS

The above objects, features and advantages of the present invention will become more apparent to those skilled in the related art in conjunction with the accompanying drawings. In the drawings:

FIG. 1 is a schematic view illustrating a conventional process for assembling multiple filaments into a bundle of filament;

FIG. 2 is a schematic view illustrating a method of assembling filaments by means of a release-winding tension controller according to the present invention;

| Description of symbols for major parts in drawings | |
|---|---|
| 1: Creel | 2: bobbin for synthetic fiber |
| 3a, 3b, 3c: driver roller | 4a, 4b: guide roller |
| 5: winder | 6: release-winding tension controller |
| 6a: lever type release-winding tension sensing device | |
| 6b: belt type release-winding tension transfer device | |
| 6c: brake | 6d: sprocket |
| 6e: release-winding tension sensor | |
| 6f: controller | |
| 7: controller for self-driving and rotational speed of creel | |

BEST MODE FOR CARRYING OUT THE INVENTION

Hereinafter, the present invention will be described in more detail from the following examples and comparative examples with reference to the accompanying drawings.

However, these are intended to illustrate the invention as preferred embodiments of the present invention and do not limit the scope of the present invention.

EXAMPLE 1

Figure 3:
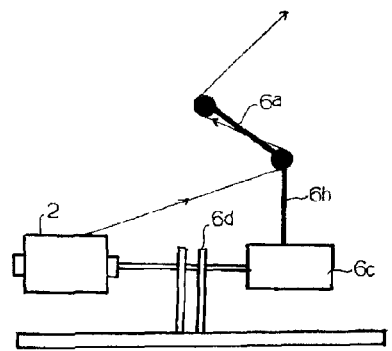
FIG. 3 is a schematic view illustrating a mechanical release-winding tension controller fixed to a creel shown in FIG. 2.

As shown in FIG. 3, a bundle of aromatic polyamide filaments was prepared by the steps of: release-winding a wholly aromatic filaments of each filament consisting of 1000 mono-filament strands with a mono fineness of 1.5 denier from five (5) creels 1. Each creel carries an individual filament. Creel has a bobbin 2 wound with one filament. The filaments are wound together around three driver rollers 3a, 3b and 3c, sequentially. Thus assembled filaments are wounded around a winder 5 to produce a bundle of filaments with a total fineness of 7,500 denier and the number of mono-filaments of 5,000.

The creel 1 was rotated by a rotational axis under a release-winding tension of the wholly aromatic polyamide filaments and was equipped with a mechanical tension controller 6 as shown in FIG. 3.

The resulting bundle of filament was subjected to evaluation of mechanical properties according to the procedures described above and the results are shown in the following Table 1.

EXAMPLE 2

Figure 4:
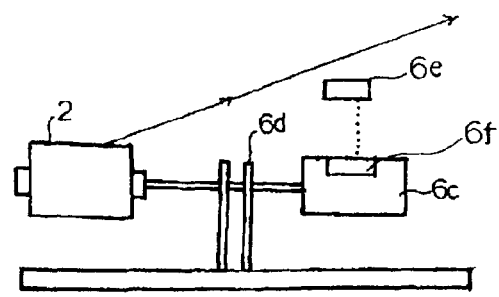
FIG. 4 is a schematic view illustrating an electrical release-winding tension controller fixed to a creel shown in FIG. 2.

As shown in FIG. 4, a bundle of wholly aromatic polyamide filaments was prepared by the steps of: release-winding wholly aromatic filaments consisting of 1000 mono filament strands with a mono fineness of 1.45 denier from three (3) creels 1. Each creel carries an individual filament. Creel 1 has a bobbin 2 wound with one filament. The filaments are wound together around three driver rollers 3a, 3b and 3c, sequentially. Thus assembled filaments are wounded around a winder 5 to produce a bundle of filament with total fineness of 4,350 denier and the number of mono-filaments of 3,000.

The creel 1 rotated by a rotational axis under a release-winding tension of the wholly aromatic polyamide filament and was equipped with an electrical tension controller 6 as shown in 4.

The resulting bundle of filament was subjected to evaluation of mechanical properties according the procedures described above and the results are shown in the following Table 1.

EXAMPLE 3

Figure 5:
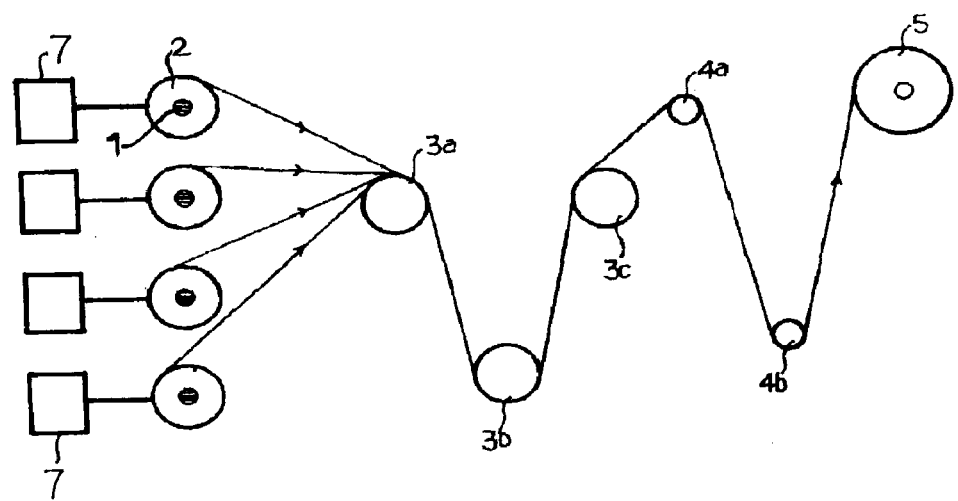
FIG. 5 is a schematic view illustrating a method of assembling filaments by means of by mounting a controller that regulates self-driving and a rotational speed of a creel 1 according to the present invention.

As shown in FIG. 5, a bundle of wholly aromatic polyamide filament was prepared by the following steps. A wholly aromatic filament consisting of 1,000 mono filament strands with a mono fineness of 1.5 denier is supplied through each of ten (10) creels 1. Creel has a bobbin 2 wound with one filament. Ten filaments from ten creels are assembled together by winding them together around driver rollers 3a, 3b, and 3c, sequentially and then winding around a winder 5 to produce a bundle of filaments. The bundle has a total fineness of 15,000 denier and 10,000 mono-filaments.

Herein, the creel 1 was equipped with a controller 7 for regulating self-driving and a rotational speed of the creel, as shown in FIG. 5, to rotate by a rotational axis under a self-driving power while controlling the rotational speed, thus resulting in a uniform release-winding tension of the wholly aromatic polyamide filament.

The resulting bundle of filament was subjected to evaluation of mechanical properties according the procedures described above and the results are shown in the following Table 1.

Comparative Example 1

As shown in FIG. 1, a bundle of wholly aromatic polyamide filament was prepared by the steps of: release-winding a wholly aromatic filament consisting of 1000 mono filament strands with mono fineness of 1.5 denier from each of five (5) creels 1, which has a bobbin 2 wound with the same filament, by means of three driver rollers 3a, 3b and 3c; assembling together all of the released filaments; and winding the assembled filaments over a winder 5 to produce a bundle of filament with total fineness of 7,500 denier and the number of filaments of 5,000.

The creel 1 rotated by a rotational axis under a release-winding tension of the wholly aromatic polyamide filaments and, as shown in FIG. 1, had no mechanical tension controller 6.

The resulting bundle of filament was subjected to evaluation of mechanical properties according the procedures described above and the results are shown in the following Table 1.

TABLE 1

Evaluation results of mechanical properties of a bundle of filaments

| Contents | Example 1 | Example 2 | Example 3 | Comparative example 1 |
|---|---|---|---|---|
| Standard deviation in weight of filaments contained in a bundle of wholly aromatic polyamide filaments per unit length of the bundle | 0.003 | 0.005 | 0.007 | 0.09 |
| A range of variance in lengths of filaments contained in a bundle of wholly aromatic polyamide filament when the bundle of filaments is cut to 500 cm under 0.05 g load per denier of the bundle | ±1.5 mm | ±1.8 mm | ±2.0 mm | ±20 mm |

Industrial Applicability

As described in detail above, a method of assembling multiple filaments according to the present invention is useful for producing a bundle of wholly aromatic polyamide filaments, which is suitable for covering optic fibers for manufacturing optic cables.

A bundle of filaments of the present invention produced by the above method is advantageously used as a material for covering optic fibers.

While the present invention has been described with reference to the accompanying drawings, it will be understood by those skilled in the art that various modifications and variations may be made therein without departing from the scope of the present invention as defined by the appended claims.

What is claimed is:

1. A bundle of filaments produced by assembling a plurality of filaments in non-twisted states, wherein a standard deviation σ of the weights of the filaments contained in the bundle of filaments per unit length of the bundle of filaments, as determined by the following standard deviation equation, ranges from 0.0001 to 0.01:

$$\sigma = \sqrt{\frac{1}{N}\sum_{i=1}^{N}(x_i - \mu)^2}$$

N=total number of filaments contained in the bundle,
μ=average of weights of the total filaments contained in the bundle, and
$x_i$=weight of individual filament,
wherein the unit length is 90 cm.

2. The bundle of filaments according to claim 1, wherein, when the bundle of filaments is cut to a length of 500 cm under a load of 0.05 g per denier of the bundle of filaments, the length of each of the filaments in the bundle is 500 cm±10 mm.

3. The bundle of filaments according to claim 1, wherein, when the bundle of filaments is cut to a length of 500 cm under a load of 0.05 g per denier of the bundle of filaments, the length of each of the filaments in the bundle is 500 cm±2 mm.

4. The bundle of filaments according to claim 1, wherein each filament is a wholly aromatic polyamide filament.

5. The bundle of filaments according to claim 1, wherein each filament has total fineness ranging from 1,400 to 15,000 denier.

6. The bundle of filaments according to claim 1, wherein each filament is composed of 1,000 to 10,000 mono-filaments.

7. The bundle of filaments according to claim 6, wherein each of the mono-filaments contained in the bundle of filament has mono fineness ranging from 1.0 to 2.5 denier.

* * * * *